US011003612B2

(12) United States Patent
Lambert et al.

(10) Patent No.: US 11,003,612 B2
(45) Date of Patent: May 11, 2021

(54) PROCESSOR/ENDPOINT CONNECTION CONFIGURATION SYSTEM

(71) Applicant: Dell Products L.P., Round Rock, TX (US)

(72) Inventors: Timothy M. Lambert, Austin, TX (US); Yogesh Varma, Austin, TX (US); Shyamkumar T. Iyer, Austin, TX (US); William Price Dawkins, Lakeway, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/396,521

(22) Filed: Apr. 26, 2019

(65) Prior Publication Data

US 2020/0341924 A1    Oct. 29, 2020

(51) Int. Cl.
*G06F 13/40* (2006.01)
*G06F 13/16* (2006.01)

(52) U.S. Cl.
CPC ......... *G06F 13/409* (2013.01); *G06F 13/16* (2013.01)

(58) Field of Classification Search
CPC .................. G06F 13/409; G06F 13/16
See application file for complete search history.

(56) References Cited

U.S. PATENT DOCUMENTS

| | | | | |
|---|---|---|---|---|
| 7,174,411 B1* | 2/2007 | Ngai | ............... | G06F 13/4022 710/305 |
| 9,984,021 B1* | 5/2018 | BeSerra | ............. | G06F 13/385 |
| 10,509,758 B1* | 12/2019 | Habusha | ............ | G06F 13/4022 |
| 2003/0131179 A1* | 7/2003 | Ajanovic | ............ | G06F 13/362 710/316 |
| 2006/0168377 A1 | 7/2006 | Vasudevan et al. | | |
| 2007/0186088 A1* | 8/2007 | Khatri | ............... | G06F 13/4018 713/1 |
| 2007/0239925 A1* | 10/2007 | Koishi | ............... | G06F 13/4022 710/316 |
| 2009/0063741 A1 | 3/2009 | Lu | | |
| 2015/0347345 A1* | 12/2015 | Hellriegel | ............ | G06F 13/409 710/301 |
| 2016/0239371 A1* | 8/2016 | Jose | .................... | G06F 11/079 |
| 2017/0212858 A1* | 7/2017 | Chu | ....................... | G06F 13/42 |

* cited by examiner

*Primary Examiner* — Tim T Vo
*Assistant Examiner* — Phong H Dang
(74) *Attorney, Agent, or Firm* — Haynes and Boone, LLP

(57) ABSTRACT

A processing subsystem/endpoint subsystem connection configuration system includes a plurality of processing subsystems and a multi-endpoint adapter device that provides a plurality of endpoint subsystems. A bus exchange switch device couples the plurality of processing subsystems to the plurality of endpoint subsystems, and a connection configuration engine is coupled to the multi-endpoint adapter device and the bus exchange switch device. The connection configuration engine receives a connection resource request that requests connection resources for a first processing subsystem that is included in the plurality of processing subsystems. Based on the connection resource request, the connection configuration engine causes at least one of the plurality of endpoint subsystems to perform a first connection resource change operation. The connection configuration engine then configures the bus exchange switch device to provide the connection resources for the first processing subsystem.

20 Claims, 8 Drawing Sheets

PROCESSOR/ENDPOINT CONNECTION CONFIGURATION SYSTEM

BACKGROUND

The present disclosure relates generally to information handling systems, and more particularly to configuring connections between processors and endpoints in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may be configured to include multiple processors and utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL@ Corporation of Santa Clara, Calif., United States) that allow the processors to access memory that is local to the other processors. Furthermore, such server devices may be provided with multi-endpoint adapter devices that provide a plurality of endpoints (e.g., PCIe endpoints). Conventionally, the processors are coupled to the multi-endpoint adapter devices via hardware with fixed/static connections in order to allow those processors to communicate with the endpoints to utilize resources available via those endpoints. However, the use of fixed/static connections between the processors and endpoints "locks" the processor/endpoint configuration, limiting or preventing the ability to add processors and/or endpoints and otherwise scale the server device.

Accordingly, it would be desirable to provide for configurability of connections between processors and endpoints.

SUMMARY

According to one embodiment, an Information Handling System (IHS) includes a first processing system; and a first memory system that is coupled to the first processing system and that includes instructions that, when executed by the first processing system, cause the first processing system to provide a connection configuration engine is configured to: receive a connection resource request that requests connection resources for at least one of a plurality of second processing subsystems; cause, based on the connection resource request, at least one of a plurality of endpoint subsystems that are included on a multi-endpoint adapter device to perform a first connection resource change operation; and configure a bus exchange switch device that couples the plurality of second processing subsystems to the plurality of endpoint subsystems in order to provide the connection resources for the at least one of the plurality of second processing subsystems.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
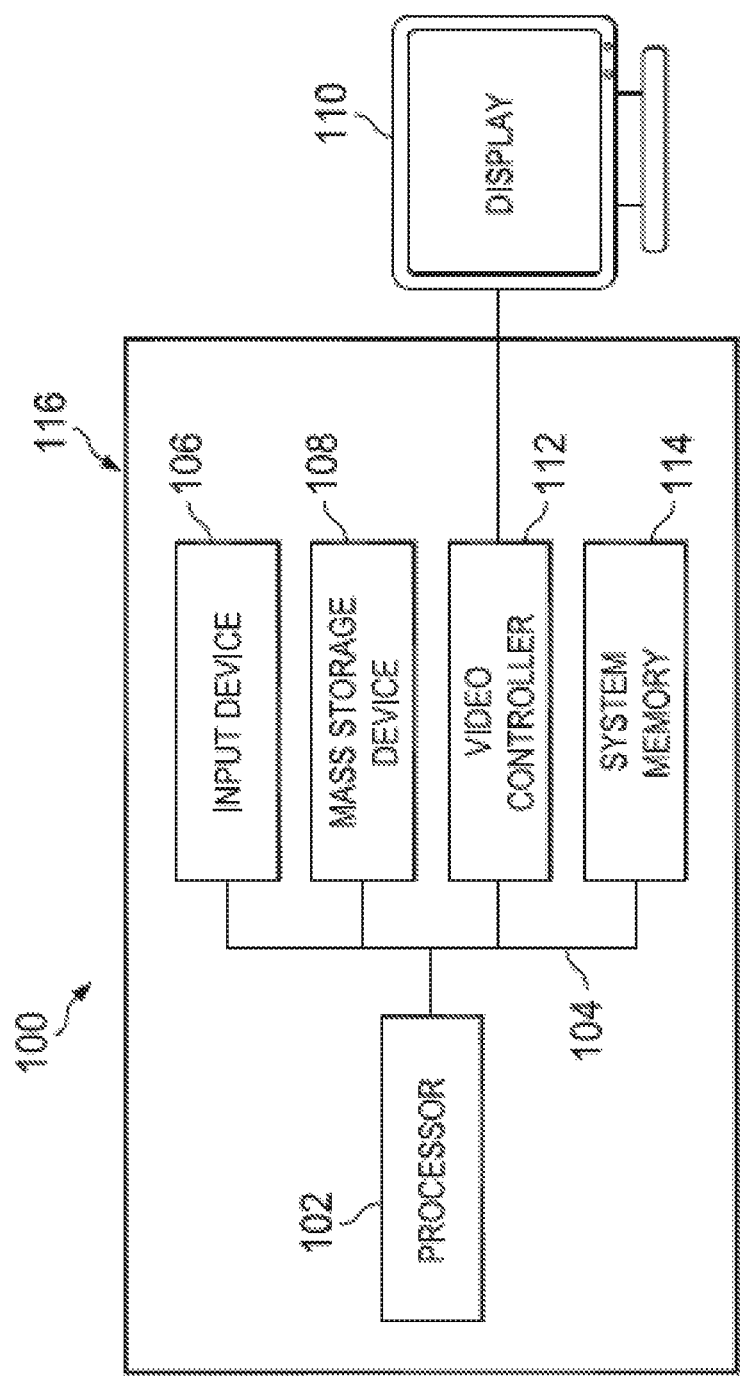
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
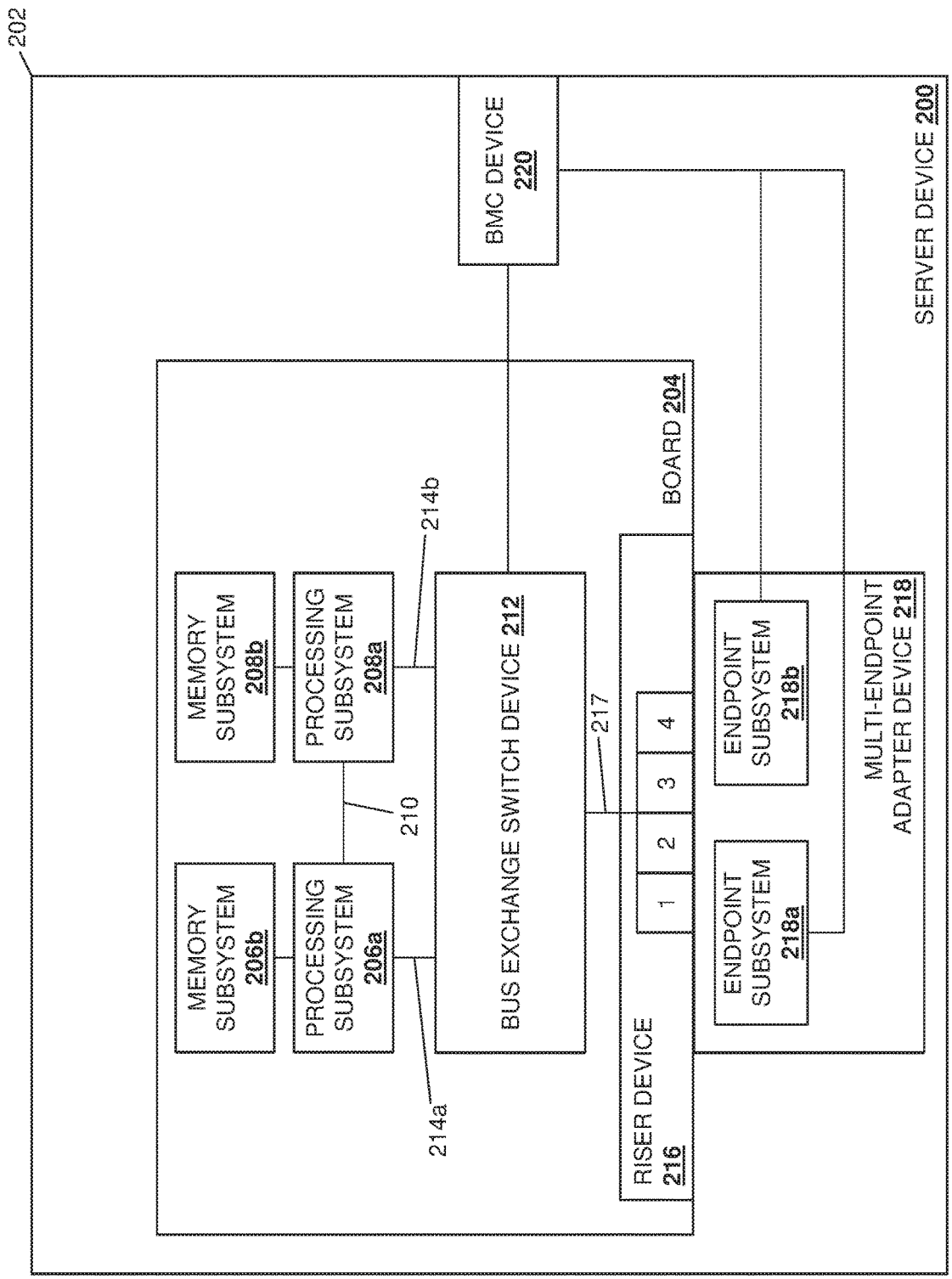
FIG. 2 is a schematic view illustrating an embodiment of a server device that provides the processing subsystem/endpoint subsystem connection configuration system of the present disclosure.

Referring now to FIG. 2, an embodiment of a server device 200 is illustrated that may provide the processing subsystem/endpoint subsystem connection configuration system of the present disclosure. In an embodiment, the server device 200 may be provided by the IHS 100 discussed above with reference to FIG. 1 and/or may include some or all of the components of the IHS 100. Furthermore, while illustrated and discussed as a server device 200, one of skill in the art in possession of the present disclosure will recognize that the functionality of the server device 200 discussed below may be provided by other devices that are configured to operate similarly as discussed below. In the illustrated embodiment, the server device 200 includes a chassis 202 that houses the components of the server device 200, only some of which are illustrated below. For example, the chassis 202 may house a board 204 such as, for example, a motherboard and/or other circuit board that would be apparent to one of skill in the art in possession of the present disclosure. As would be understood by one of skill in the art in possession of the present disclosure, the board 204 (or at least portions of the board 204) may provide and/or enable connections (e.g., traces, cabling, and/or other connections known in the art) between the processing subsystems and endpoints discussed below.

A plurality of processing subsystems are provided on the board 204 and are coupled together via processing subsystem interconnects such as, for example, Ultra-Path Interconnects (UPI) available on processing systems provided by INTEL® corporation of Santa Clara, Calif., United States. For the purposes of the example provided below, the embodiment of the server device 200 illustrated in FIG. 2 provides an example of a two processor system having a processing subsystem 206a and a processing subsystem 208a included on the board 204 and coupled together via a UPI 210. Furthermore, each of the processing subsystems 206a and 208a are provided with, and connected to, respective memory subsystems 206b and 208b. For example, the processing subsystems and memory subsystems in the server device 200 may utilize a Non-Uniform Memory Access (NUMA) computer memory design in which each respective processing subsystem is connected a respective local memory subsystem to provide a respective NUMA node (i.e., the processing subsystem 206a and its local memory subsystem 206b provide a first NUMA node, and the processing subsystem 208a and its local memory subsystem 208b provide a second NUMA node.) However, while two processing subsystems/memory subsystems (e.g., two NUMA nodes) are illustrated in FIG. 2, one of skill in the art in possession of the present disclosure will recognize that more processing subsystems/memory subsystems (e.g., four NUMA nodes) may be provided according to the teachings of the present disclosure while falling within its scope as well.

In the illustrated embodiment, each of the processing subsystems 206a and 208a are coupled to a bus exchange switch device 212 that may be provided on the board 204, with the processing subsystem 206a connected to the bus exchange switch device 212 via a connection 214a provided on the board 204, and the processing subsystem 208a is connected to the bus exchange switch device 212 via a connection 214b provided on the board 204. In the examples provided below, the connections 214a and 214b (e.g., provided by traces, cabling, and/or other connection components known in the art) each provide a respective x16 connection, although one of skill in the art in possession of the present disclosure will recognize that other connection sizes will fall within the scope of the present disclosure as well.

In different examples, the bus exchange switch device 212 may be provided by an analog bus exchange switch device, a logical bus exchange switch device, a digital bus exchange switch device, and/or a variety of other bus exchange switch devices that would be apparent to one of skill in the art in possession of the present disclosure. While illustrated and described as a bus exchange switch device, one of skill in the art in possession of the present disclosure will recognize that other subsystems may perform the functionality of the bus exchange switch device 212 discussed below while remaining within the scope of the present disclosure as well. In the illustrated embodiment, the bus exchange switch device 212 may be provided by hardware on the board 204 that is coupled to a riser device 216 that is included on the board 204 via, for example, a connection 217. In the examples provided below, the connection 217 (e.g., provided by traces, cabling, and/or other connection components known in the art) provides a x16 connection, although one of skill in the art in possession of the present disclosure will recognize that other connection sizes will fall within the scope of the present disclosure as well. As described below, the bus exchange switch device 212 is configurable to provide for the allocation of connection resources between its connected processing subsystems 206a and 208a and the riser device 216 (e.g., configuring connections between any portion of the x16 connection 214a and the x16 connection 217, and/or any portion of the x16 connection 214b and the x16 connection 217.) As such, one of skill in the art in possession of the present disclosure will recognize that the bus exchange switch device 212 may include the multiplexers discussed below, and/or other physical and/or logical components to enable the allocation of connection resources in the manners described below.

In other embodiments, the bus exchange switch device 212 may be provided as part of the riser device 216, included on a device (e.g., an expansion card) coupled to the board 204, provided in the multi-endpoint adapter device discussed below, and/or provided in a variety of other manners while remaining within the scope of the present disclosure as well (i.e., the bus exchange switch device 212 may be provided on either side of a SERDES/PHY layer provided in the processing subsystem/endpoint subsystem connection configuration system). In the specific examples discussed in further detail below, the riser device 216 is illustrated as including a x16 connector (e.g., a PCIe connector) that includes four x4 connectors illustrated in FIG. 2 (e.g., the x4 connectors numbered "1", "2", "3", and "4"), and that is connected through the x16 connection 217 to the bus exchange switch device 212. However, while illustrated as including a single x16 connector, one of skill in the art in possession of the present disclosure will recognize that the riser device 216 (or board 204) may include multiple similar connectors (e.g., a second x16 connector) that are configured to couple to additional multi-endpoint adapter devices similar to the multi-endpoint adapter device discussed below. In some embodiments, the riser device 216 may be configured to describe one or more connection topologies on the board 204 to endpoints provided by a multi-endpoint adapter device that is coupled to the riser device 216. However, while illustrated and described as coupled to a riser device 216, in other embodiments the bus exchange switch device 212 may be coupled to a connector (e.g., a x16 connector) mounted to the board 204 while remaining within the scope of the present disclosure as well.

In the illustrated embodiment, and for the purposes of the examples provided below, a multi-endpoint adapter device 218 is coupled to the riser device 216 via the x16 connector (i.e., a connector edge on the multi-endpoint adapter device 218 may engage the x4 connectors numbered "1", "2", "3", and "4" that provide the x16 connector on the riser device 216). In the illustrated embodiment, the multi-endpoint adapter device 218 includes a pair of endpoint subsystems 218a and 218b, either or both of which may be provided by Peripheral Component Interconnect express (PCIe) endpoint devices, although other endpoint subsystems will fall within the scope of the present disclosure as well. The endpoint subsystems 218a and 218b may be coupled to the riser device 216 via one or more physical layer (PHY) devices (not illustrated) provided between the endpoint subsystems 218a and 218b and the connector edge on the multi-endpoint adapter device 218 (e.g., a single PHY device may be provided for both of the endpoint subsystems 218a/218b when those endpoint subsystems 218a/218b are provided by a single PCIe device, while a separate PHY device may be provided for each endpoint subsystem 218a/218b with those endpoint subsystems 218a/218b are provided by separate PCIe devices.) As discussed above, while only a single multi-endpoint adapter device 218 is illustrated in the examples provided below, a plurality of multi-endpoint adapter devices that operate similarly to the multi-endpoint adapter device 218 may be coupled to the riser device 216 (e.g., via additional x16 connectors provided on the riser device 216) while remaining within the scope of the present disclosure as well. In a specific embodiment, the endpoint subsystems 218a and/or 218b may be Network Interface Controllers (NICs), although one of skill in the art in possession of the present disclosure will recognize that other types of endpoints subsystems providing other types of functionality will fall within the scope of the present disclosure as well.

In the illustrated embodiment, a Baseboard Management Controller (BMC) device 220 is included in the chassis 202 and coupled to the bus exchange switch device 212 and each of the endpoint subsystems 218a and 218b on the multi-endpoint adapter device 218. For example, the BMC device 220 may be provided by an integrated DELL® Remote Access Controller (iDRAC) available from DELL® Inc. of Round Rock, Tex., United States, although other remote access controller devices and/or BMC devices will fall within the scope of the present disclosure as well. In the embodiments discussed below, the BMC device 220 includes a BMC processing system that is coupled to a BMC memory system that includes instructions that, when executed by the BMC processing system, cause the BMC processing system to provide a connection configuration engine that is configured to perform the functionality of the connection configuration engines and BMC devices discussed below. However, one of skill in the art in possession of the present disclosure will recognize that the connection configuration engine of the present disclosure may be provided by other hardware/software subsystems/hardware coordinating logic in the server device 200, and/or may be connected to the server device 200 (e.g., in a network-connected management system) while remaining within the scope of the present disclosure as well. While a specific server device 200 has been illustrated, one of skill in the art in possession of the present disclosure will recognize that server devices (or other devices operating according to the teachings of the present disclosure in a manner similar to that described below for the server device 200) may include a variety of components and/or component configurations for providing conventional server device functionality, as well as the functionality discussed below, while remaining within the scope of the present disclosure as well.

Figure 3:
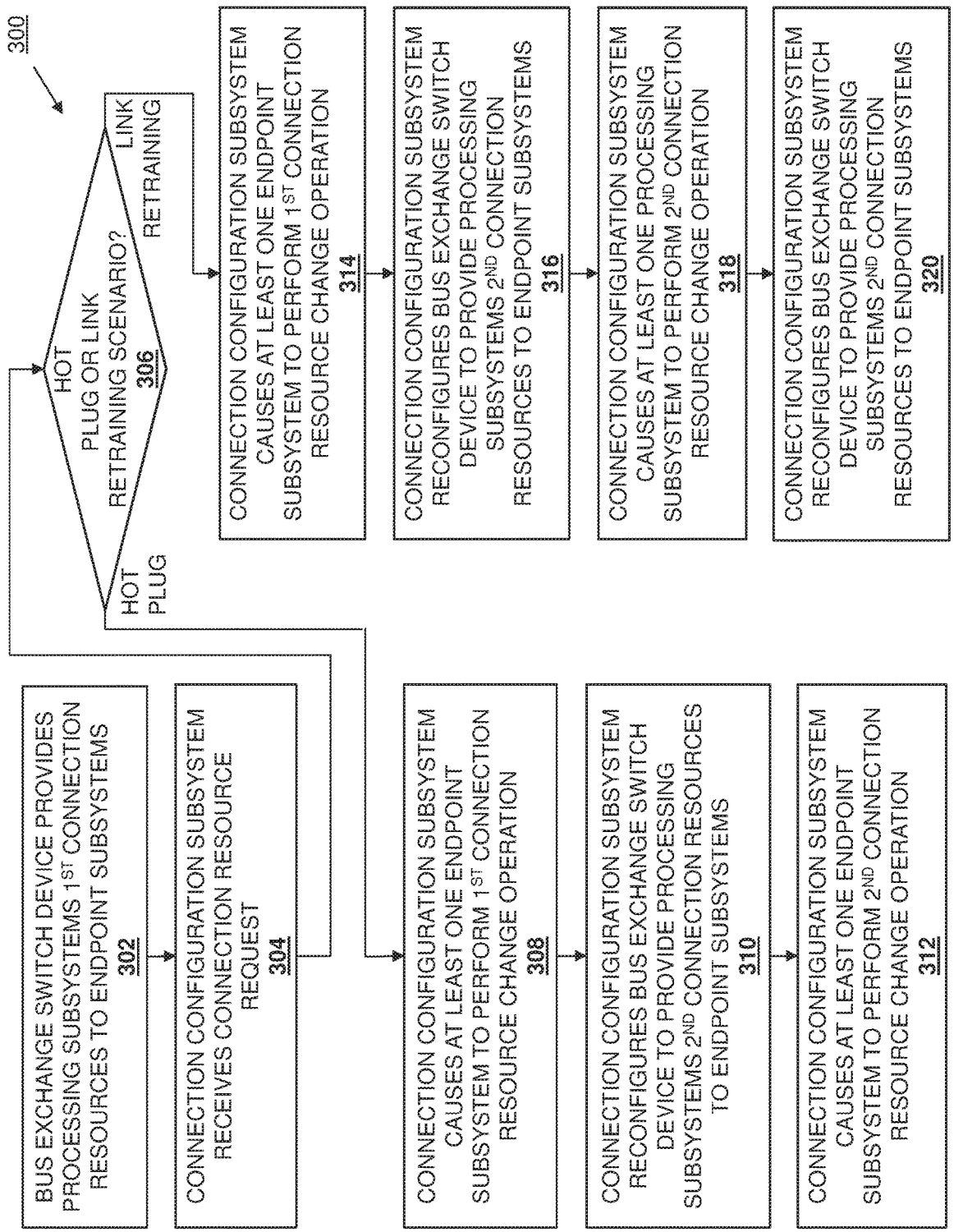
FIG. 3 is a flow chart illustrating an embodiment of a method for configuring connections between processing subsystems and endpoint subsystems.

Referring now to FIG. 3, an embodiment of a method for configuring connections between processing subsystems and endpoint subsystems is illustrated. As discussed below, the systems and methods of the present disclosure provide for the configuration of connections between processing subsystems and endpoints subsystems using, for example, a bus exchange switch device that may be configured to allocate connection resources to particular processing subsystems and endpoint subsystems in response to connection resource requests associated with applications running on any of those processing subsystems. A connection configuration engine provided on, for example, a BMC device in a server device, may receive a connection resource request from a host agent provided in an operating system application run by one of plurality of processing subsystems included in the server device. That connection resource request may request first connection resources for a first processing subsystem included in the plurality of processing subsystems for communicating with at least one endpoint subsystem provided on a multi-endpoint adapter device that is included in the server device and coupled to the processing subsystems via a bus exchange switch device.

Depending on the current connection configuration between the plurality of processing subsystems and the plurality of endpoint subsystems, the connection resource request may require connection reconfigurations that involve a "hot plug" scenario and/or a "link retraining" scenario. In situations where the connection resource request requires connection reconfigurations that involve a "hot plug" scenario, the connection configuration engine cause endpoint subsystem(s) affected by the connection reconfigurations to perform "hot removal" operations, and then may reconfigure the bus exchange switch device in order to reconfigure the connections according to the connection resource request in a manner that enables the first connection resources for the first processing subsystem for communicating with the at least one endpoint subsystem. The connection reconfiguration engine may then cause endpoint subsystem(s) affected by the connection reconfigurations to perform "hot add" operations, which provides for the allocation of the first connection resources for the first processing subsystem to communicate with the at least one endpoint subsystem.

In situations where the connection resource request requires connection reconfigurations that involve a "link retraining" scenario, the connection configuration engine cause endpoint subsystem(s) affected by the connection reconfigurations to perform "lower maximum bus width advertisement" operations, and then may reconfigure the bus exchange switch device in order to remove connections from those endpoint subsystems. The connection reconfiguration engine may then cause processing subsystem(s) affected by the connection reconfigurations to perform "link retraining" operations, and may reconfigure the bus exchange switch device in order to add connections to endpoint subsystems, which provides for the allocation of the first connection resources for the first processing subsystem to communicate with the at least one endpoint subsystem. As such, the connection configuration engine (e.g., provided on a BMC device) may orchestrate static/"cold" connection reconfigurations when the server device is powered down, operating system "hot plug" connection reconfigurations when an endpoint becomes available or unavailable during runtime operations for the server device, and/or "live bus retraining" connection reconfigurations to modify lane widths between processing subsystems and endpoint subsystems. As such, the connection reconfiguration techniques provided by the present disclosure enable the use of a common riser device and multi-endpoint adapter device for various connection scenarios, allowing for upgrades, connection re-balancing, and connection re-mapping during boot and runtime operations to ensure server device uptime. Furthermore, the connection reconfiguration techniques provided by the present disclosure remove the need for providing an external bus exchange switch or PCIe switch to allow for some desired configurations.

The method 300 begins at block 302 where a bus exchange switch device provides one or more processing subsystems first connection resources to endpoint subsystems. In an embodiment, at block 302, the bus exchange switch device 212 may be provided in a first connection configuration (e.g., a default connection configuration) that provides the processing subsystems 206a and 206b particular connection resources to the endpoint subsystems 218 and 218. While in the examples below, the connection resources illustrated in FIG. 4 are described as provided by the bus exchange switch device 212 having a "first connection configuration", one of skill in the art in possession of the present disclosure will recognize that any of the connection resources illustrated in FIG. 4, 5, 6, 7, or 8 may be provided by the bus exchange switch device 212 via a "first connection configuration", and that the bus exchange switch device 212 may be reconfigured according to the method 300 from providing connection resources illustrated in any of the FIG. 4, 5, 6, 7, or 8 to providing connection resources illustrated in any of the others of those FIG. 4, 5, 6, 7, or 8 while remaining within the scope of the present disclosure as well.

Figure 4:
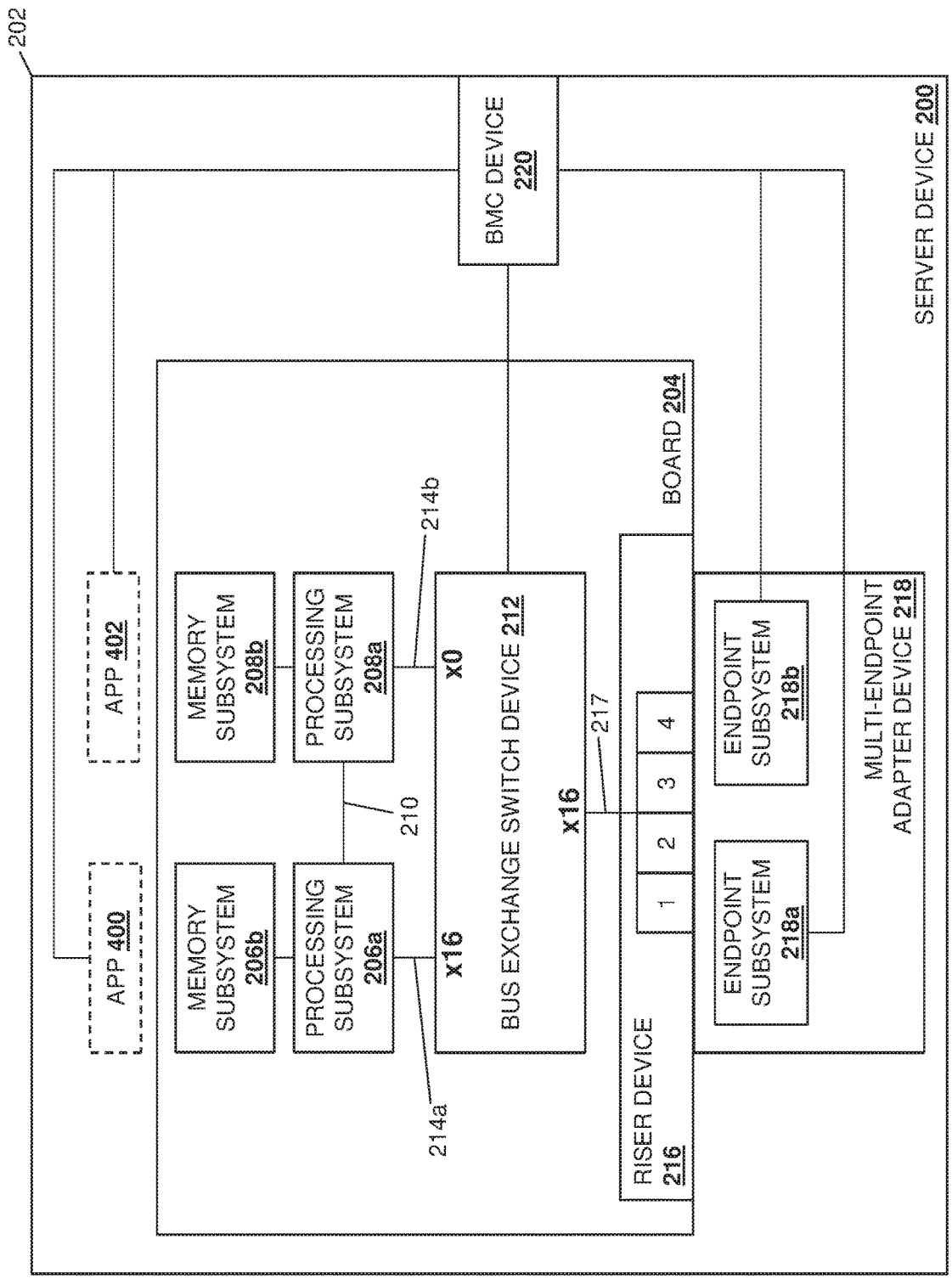
FIG. 4 is a schematic view illustrating an embodiment of the processing subsystem/endpoint subsystem connection configuration system in the server device of FIG. 2 with the connections between processing subsystem(s) and endpoint subsystem(s) having been configured.

As such, as illustrated in FIG. 4, at block 302 the bus exchange switch device 212 may have been configured to provide the processing subsystems 206a and 208a first connection resources to the endpoint subsystems 218a and 218b by providing for the connection of each of the x16 connections included in the connection 214a to the processing subsystem 206a to each of the x16 connections included in the connection 217 provided to the riser device 216 (indicated in FIG. 4 via the "x16" element located in the bus exchange switch device 212 and adjacent the connection 214a), while not providing for the connection of any of the x16 connections included in the connection 214b to the processing subsystem 208a to any of the x16 connections included in the connection 217 provided to the riser device 216 (indicated in FIG. 4 via the "x0" element located in the bus exchange switch device 212 and adjacent the connection 214b). For example, at block 302, the bus exchange switch device 212 may have had one or more multiplexer(s) included in the bus exchange switch device 212 configured to route each connector included in the connection 214a to respective connectors included in the connection 217, while preventing any connectors included in the connection 214b from being routed to any connectors included in the connection 217.

Thus, in the embodiment illustrated in FIG. 4, the processing subsystem 206a may be provided all of the direct communication resources available via the bus exchange switch device 212 and to the endpoint subsystems 218a and 218b, allowing an application 400 provided by the processing subsystem 206a (e.g., via the execution of application code included on the memory subsystem 206b) to directly access those endpoint subsystems via a x16 connection, while the processing subsystem 208a may be required to utilize the UPI 210 in order to allow an application 402 provided by that processing subsystem 208a (e.g., via the execution of application code included on the memory subsystem 208b) to communicate with those endpoint subsystems 218a and 218b (e.g., via the processing subsystem 206a.) However, while a specific connection configuration and connection configuration technique has been described, one of skill in the art in possession of the present disclosure will recognize that other connection configuration and/or connection configuration techniques may be utilized while remaining within the scope of the present disclosure as well.

The method 300 then proceeds to block 304 where a connection configuration subsystem receives a connection resource request. In an embodiment, at block 304, a connection configuration subsystem such as, for example, the connection configuration engine provided by the BMC device 220 as discussed above, may receive a connection resource request. For example, at block 304 a host agent may generate and transmit a connection resource request that requests connection resources for one or more of the processing subsystems 206a and 208a. In an embodiment, the connection resource request may identify an application for which the connection resource request is being made, a processing subsystem for which the connection resource request is being made, connection resource details that identify any connection resources being requested (e.g., a connection bandwidth resource being requested), lane width requirements, maximum bus speeds (e.g., limiting a first link to generation 3 speeds and limiting a second link to generation 4 speeds), hot plug support information, alternative fabric types (e.g., CXL, Gen-Z, SATA, etc.), and/or other connection resource request information that would be apparent to one of skill in the art in possession of the present disclosure.

As would be understood by one of skill in the art in possession of the present disclosure, the host agent generating and transmitting the connection resource request at block 304 may be included in one of the applications 400 or 402 (e.g., operating system applications) provided by the processing subsystems 206a or 208b, respectively, and the connection resources may be requested by that host agent for use by their associated application and/or processing subsystem (e.g., that application and/or processing subsystem may require increased communication bandwidth with one or more of the endpoint subsystems 218a and 218b.) As such, as illustrated in FIGS. 4, 5, 6, 7, and 8, each of the applications 400 and 402 includes a respective host interface with the BMC device 200 that may be provided by, for example, a Low Pin Count (LPC) interface, an enhanced Serial Peripheral Interface (eSPI), and/or other host interfaces that would be apparent to one of skill in the art in possession of the present disclosure. However, in other embodiments, the host agent generating and transmitting the connection resource request at block 304 may be included in a management and/or monitoring console that may be separate from the server device 200 and that may manage and/or monitor the performance of the server device 200. However, the host agent may be provided in a variety of other devices and/or subsystems while remaining within the scope of the present disclosure as well.

As such, at block 304, the connection configuration engine provided by the BMC device 220 may receive a connection resource request that may different depending on the current connection configuration of the bus exchange switch device 212 with regard to the processing subsystems 206a and 208a, the connection reconfiguration of the bus exchange switch device 212 being requested by the connection resource request, and/or other factors that would be apparent to one of skill in the art in possession of the present disclosure. In the specific examples provided below, the connection resource request received by the connection configuration engine from the host agent is associated with a request to alter the connection bandwidth resources allocated to the processing subsystems 206a and 208a (e.g., to change the processing subsystem connection bandwidth resource ratios), which as discussed below may involve a "hot plug" scenario and/or a "live retraining" scenario in order to perform the connection resource reconfiguration/reallocation. However, connection resource requests provided according to the teachings of the present disclosure may involve other connection resource reconfiguration/reallocation scenarios that will fall within the scope of the present disclosure as well.

The method 300 may then proceed differently depending on whether the connection configuration resource change involves the "hot plug" scenario, the "link retraining" scenario, or both at decision block 306. For example, the "hot plug" scenario may exist when a connection configuration resource change involves endpoint subsystem(s) losing all of their connection resources to a processing subsystem they were connected to, and/or being provided connection resources to a processing subsystem they were not previously connected to. Furthermore a "link retraining" scenario may exist when a connection configuration resource change involves endpoint subsystem(s) having their connection resources reallocated between processing subsystems. As such, one of skill in the art in possession of the present disclosure will recognize that a connection configuration resource change may include both a "hot plug" scenario for connection resource reconfigurations/reallocations that completely connect or disconnect endpoint subsystems and processing subsystems, and a "link retraining" scenario for connection resource reconfigurations/reallocations that reallocate the connection resources between endpoint subsystems and processing subsystems.

Thus, when the configuration resource change involves a "hot plug" scenario, the method 300 proceeds to block 308 where the connection configuration subsystem may cause at least one endpoint subsystem to perform a first connection resource change operation. In an embodiment, at block 308 and as discussed in further detail with regard to the examples provided below, the connection configuration engine in the BMC device 220 may cause at least one of the endpoint subsystems 218a and 218b (e.g., via an Inter-Integrated Circuit ($I^2C$) communication provided via an $I^2C$ bus to that endpoint subsystem) to perform first connection resource change operations that, in the 'hot plug" scenario, involve a "hot removal" operation that disconnects that endpoint subsystem from a processing subsystem that will not have any connection resources allocated for communicating with that endpoint subsystem following the connection reconfiguration/allocation.

The method 300 then proceeds to block 310 where the connection configuration subsystem reconfigures the bus exchange switch device to provide processing subsystem(s) second connection resources to endpoint subsystems. In an embodiment, at block 310 and as discussed in further detail with regard to the examples provided below, following the completion of the "hot removal" operations by the endpoint subsystem(s) at block 308, the connection configuration engine in the BMC device 220 may operate to reconfigure the bus exchange switch device 212 (e.g., via an $I^2C$ communication provided via an $I^2C$ bus to the bus exchange switch device) which, in the 'hot plug" scenario, involves providing for the modification of the physical connections provided by the bus exchange switch device 212 (e.g., via the modification of multiplexer(s) in the bus exchange switch device 212) in a manner that satisfies the request for communication resources that was received at block 304.

The method 300 may then proceed to block 312 where the connection configuration subsystem may cause at least one endpoint subsystem to perform a second connection resource change operation. In an embodiment, at block 312 and as discussed in further detail with regard to the examples provided below, the connection configuration engine in the BMC device 220 may cause at least one of the endpoint subsystems 218a and 218b (e.g., via an $I^2C$ communication provided via an $I^2C$ bus to that endpoint subsystem) to perform second connection resource change operations that, in the 'hot plug" scenario, involve a "hot add" operation to connect that endpoint subsystem to a processing subsystem that has been allocated connection resources for communicating with that endpoint subsystem following the reconfiguration of the bus exchange switch device 212 at block 310.

If the configuration resource change involves a "link retraining" scenario, the method 300 proceeds to block 314 where the connection configuration subsystem may cause at least one endpoint subsystem to perform a first connection resource change operation. In an embodiment, at block 314 and as discussed in further detail with regard to the examples provided below, the connection configuration engine in the BMC device 220 may cause at least one of the endpoint subsystems 218a and 218b (e.g., via an $I^2C$ communication provided via an $I^2C$ bus to that endpoint subsystem) that will lose connection resources to the processing subsystem(s) to perform first connection resource change operations that, in the 'link retraining" scenario, involve a "lower maximum bus width advertisement" operation that causes that endpoint subsystem to advertise what will be its lower maximum bus width upon the next link retaining operation (i.e., due to the loss of the connection resources).

The method 300 then proceeds to block 316 where the connection configuration subsystem reconfigures the bus exchange switch device to provide processing subsystem(s) second connection resources to endpoint subsystems. In an embodiment, at block 310 and as discussed in further detail with regard to the examples provided below, the connection configuration engine in the BMC device 220 may operate to reconfigure the bus exchange switch device 212 (e.g., via an I²C communication provided via an I²C bus to the bus exchange switch device) which, in the 'link retraining" scenario, involves providing for the removal of the physical connections provided by the bus exchange switch device 212 (e.g., via the modification of multiplexers in the bus exchange switch device 212) between processing subsystem(s) and endpoint subsystem(s) in order to free up connection resources in a manner that allows for the satisfaction of the request for connection resources that was received at block 304.

The method 300 may then proceed to block 318 where the connection configuration subsystem may cause at least one processing subsystem to perform a second connection resource change operation. In an embodiment, at block 318 and as discussed in further detail with regard to the examples provided below, the connection configuration engine in the BMC device 220 may cause at least one of the processing subsystems 206a and 208a (e.g., via an I²C communication provided via an I²C bus to that processing subsystem) to perform a "link retraining" operation (e.g., on its port(s) (typically a root complex) located upstream from the bus exchange switch device 212)) that corresponds to the reduced connection resources requested via the connection resource request received at block 304.

The method 300 then proceeds to block 320 where the connection configuration subsystem reconfigures the bus exchange switch device to provide processing subsystem(s) second connection resources to endpoint subsystems. In an embodiment, at block 310 and as discussed in further detail with regard to the examples provided below, the connection configuration engine in the BMC device 220 may operate to reconfigure the bus exchange switch device 212 (e.g., via an I²C communication provided via an I²C bus to the bus exchange switch device) which, in the 'link retraining" scenario, involves providing for the addition of the physical connections provided by the bus exchange switch device 212 (e.g., via the modification of multiplexers in the bus exchange switch device 212) between processing subsystem(s) and endpoint subsystem(s) to allocate the connection resources that were freed up at block 316 in a manner that satisfies the request for connection resources that was received at block 304.

Some specific examples of the performance of blocks 308, 310, and 312 of the method 300 in performing the operations associated with the "hot plug" scenario, as well as blocks 314, 316, 318, and 320 of the method 300 in performing operations associated with the "live retraining" scenario, will now be provided. However, while specific examples are provided, one of skill in the art in possession of the present disclosure will recognize that other functionality may be performed to provide for configurations that are not explicitly illustrated in the examples below including, for example, the freeing up of connection resources without reallocating those connection resources to endpoint subsystems in order to achieve a desired connection resource balance, allocating connection resources in non-power-of-2 widths (e.g., x4, x12, etc.) when doing so is supported by the PCIe specification, and/or other configurations and configuration functionality that would be apparent to one of skill in the art in possession of the present disclosure.

Figure 5:
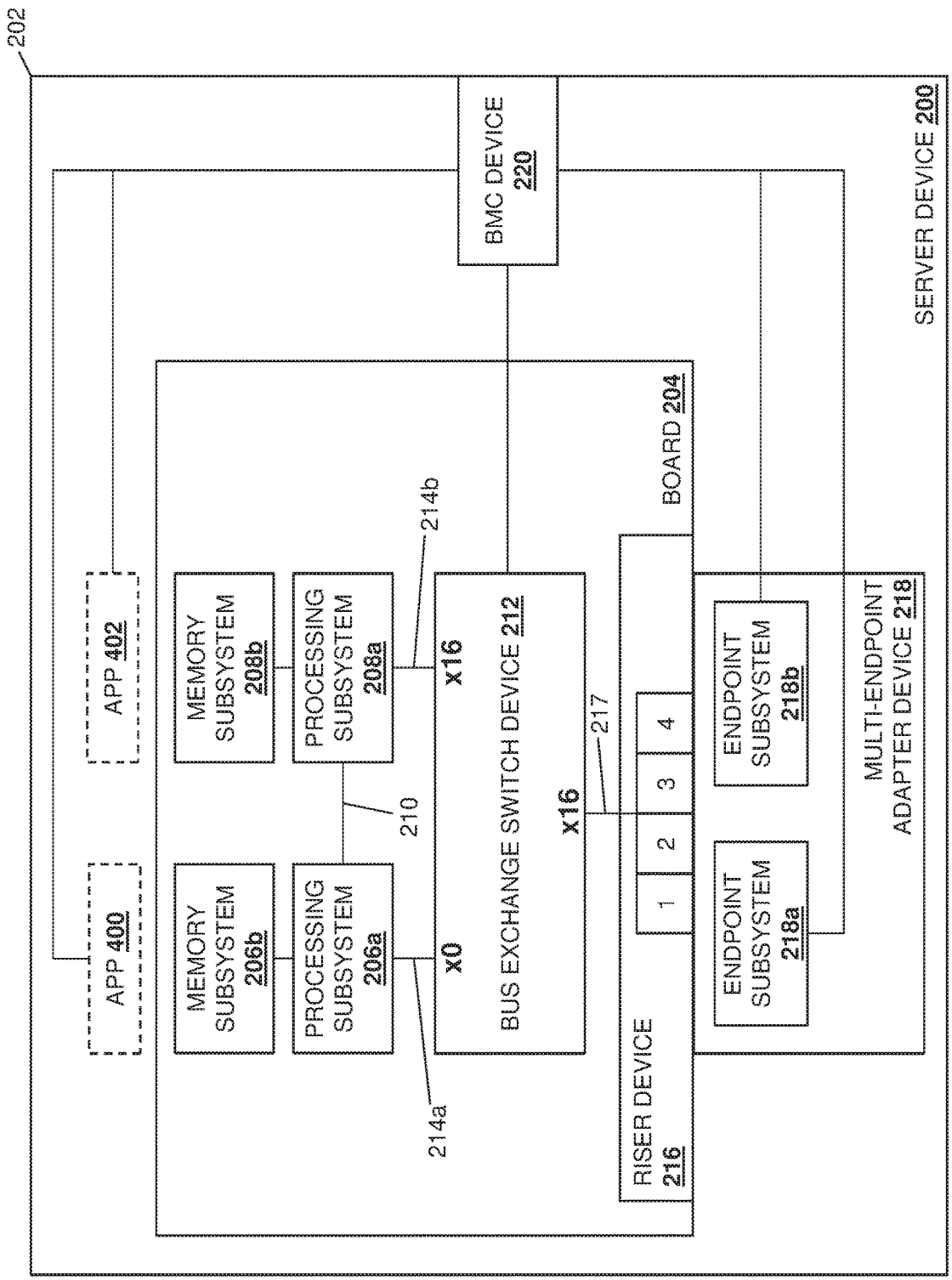
FIG. 5 is a schematic view illustrating an embodiment of the processing subsystem/endpoint subsystem connection configuration system in the server device of FIG. 2 having reconfigured the connections between processing subsystem(s) and endpoint subsystem(s) illustrated in FIG. 4.

With reference to FIGS. 4 and 5, at block 304 the connection resource request received by the connection configuration engine in the BMC device 220 may request (or provide for) a reconfiguration that reallocates all of the connection resources to the processing subsystem 208a. For example, the application 402 provided by the processing subsystem 208a (e.g., via execution of the application code stored on the memory subsystem 208b as discussed above) may require a maximum bandwidth available to the endpoint subsystems, and thus the host agent (e.g., running in the application 402 or elsewhere) may generate and transmit the connection resource request that provides for reallocation of all the connection resources to the processing subsystem 208a. As will be appreciated by one of skill in the art in possession of the present disclosure, such a reallocation will provide only the "hot plug" scenario discussed above, as the connection configuration resource change involves the endpoint subsystem(s) losing all of their connection resources to the processing subsystem 206a they are currently connected to, and being provided connection resources to the processing subsystem 208a that they were not previously connected to.

Thus, with reference to the portion of the method 300 discussed above with reference to the "hot plug" operations, at block 308 the connection configuration engine in the BMC device 220 may cause each of the endpoint subsystems 218a and 218b to perform the "hot removal" operations and, once those "hot removal" operations are completed, the connection configuration engine in the BMC device 220 may operate at block 310 to reconfigure the bus exchange switch device 212 (e.g., via an I²C communication provided via an I²C bus to the bus exchange switch device) by, for example, providing for the modification of the physical connections provided by the bus exchange switch device 212 (e.g., via the modification of multiplexers in the bus exchange switch device 212) to disconnect each of the x16 connections included in the connection 214a to the processing subsystem 206a from each of the x16 connections included in the connection 217 provided to the riser device 216 (indicated by the changing of the "x16" element located in the bus exchange switch device 212 and adjacent the connection 214a in FIG. 4 to a "x0" element in FIG. 5), while providing for the connection of each of the x16 connections included in the connection 214b to the processing subsystem 208a to respective x16 connections included in the connection 217 provided to the riser device 216 (indicated by the change of the "x0" element located in the bus exchange switch device 212 and adjacent the connection 214b in FIG. 4 to a "x16" element in FIG. 5). At block 312, the connection configuration engine in the BMC device 220 may then cause each of the endpoint subsystems 218a and 218b to perform the "hot add" operations such that the processing subsystem 208a is now provided all of the connection resources (e.g., the x16 connection provided via the bus exchange switch device 212 to the four x4 connectors "1", "2", "3", and "4" in the riser device 216) to the endpoint subsystems 218 and 208b.

Figure 6:
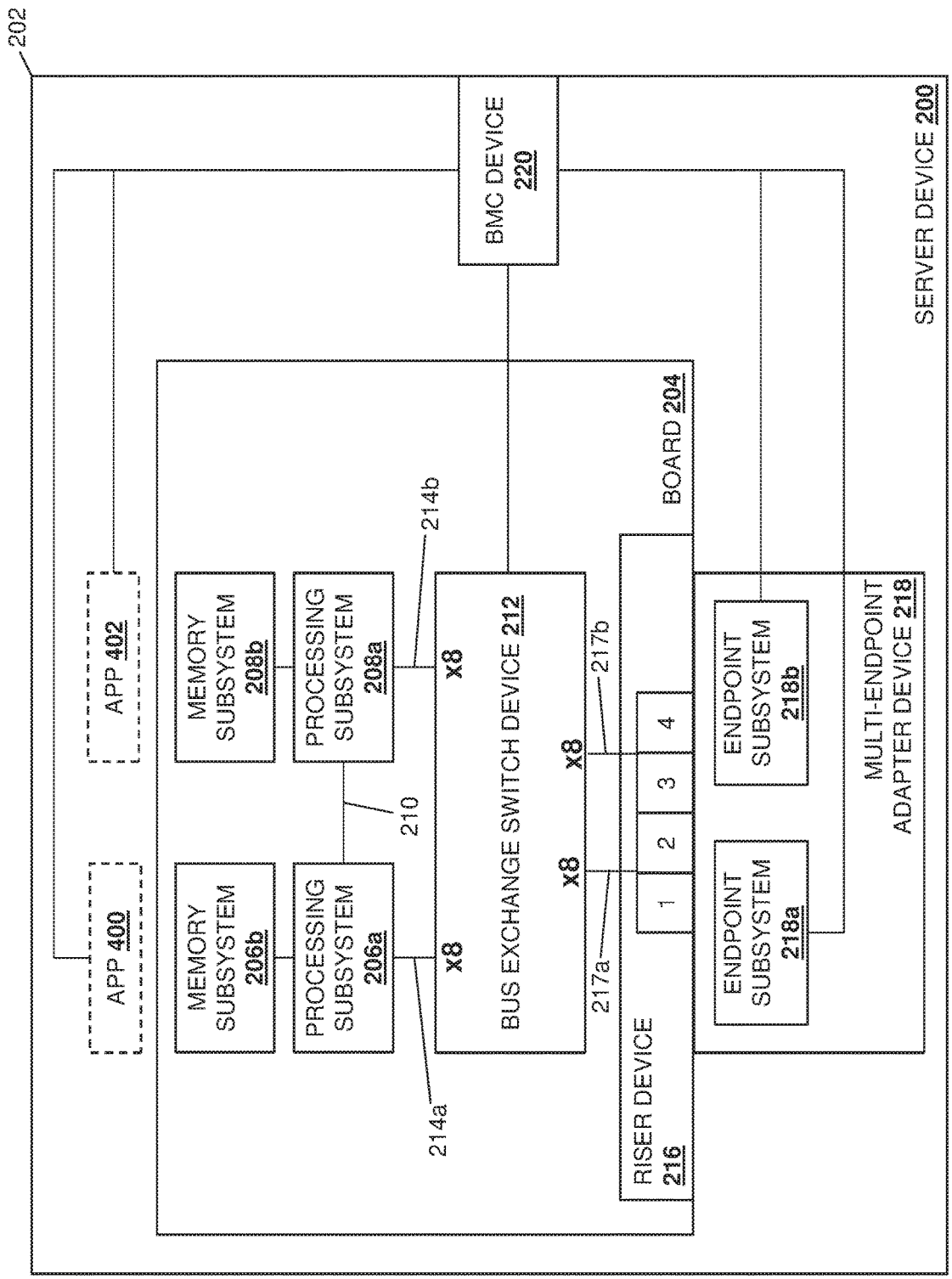
FIG. 6 is a schematic view illustrating an embodiment of the processing subsystem/endpoint subsystem connection configuration system in the server device of FIG. 2 having reconfigured connections between processing subsystem(s) and endpoint subsystem(s) illustrated in FIG. 4.

With reference to FIGS. 4 and 6, at block 304 the connection resource request received by the connection configuration engine in the BMC device 220 may request (or provide for) a reconfiguration that reallocates a portion of the connection resources to the processing subsystem 208a.

For example, the application 402 provided by the processing subsystem 208a (e.g., via execution of the application code stored on the memory subsystem 208b as discussed above) may require at least some bandwidth available to the endpoint subsystems, and thus the host agent (e.g., running in the application 402 or elsewhere) may generate and transmit the connection resource request that provides for reallocation of a portion of the connection resources to the processing subsystem 208a. As will be appreciated by one of skill in the art in possession of the present disclosure, such a reallocation will provide both the "hot plug" scenario and the "link retraining" scenario discussed above, as the connection configuration resource change involves the endpoint subsystem(s) reallocating a portion of their connection resources with the processing subsystem 206a to the processing subsystem 208a, and being provided connection resources to the processing subsystem 208a that they were not previously connected to.

Thus, with reference to the portion of the method 300 discussed above with reference to the "hot plug" operations, at block 308 the connection configuration engine in the BMC device 220 may cause each of the endpoint subsystems 218a and 218b to perform the "hot removal" operations and, once those "hot removal" operations are completed, may operate at block 310 to reconfigure the bus exchange switch device 212 (e.g., via an I²C communication provided via an I²C bus to the bus exchange switch device) by, for example, providing for the modification of the physical connections provided by the bus exchange switch device 212 (e.g., via modifications of the multiplexers in the bus exchange switch device 212) to disconnect x8 connections included in the connection 214a to the processing subsystem 206a from x8 connections included in the connection 217 provided to the riser device 216 (indicated by the change of the "x16" element located in the bus exchange switch device 212 and adjacent the connection 214a in FIG. 4 to a "x8" element in FIG. 6), while providing for the connection of x8 connections included in the connection 214b to the processing subsystem 208a to respective x8 connections included in the connection 217 provided to the riser device 216 (indicated by the change of "x0" element located in the bus exchange switch device 212 and adjacent the connection 214b in FIG. 4 to a "x8" element in FIG. 6). At block 312 the connection configuration engine in the BMC device 220 may then cause each of the endpoint subsystems 218a and 218b to perform the "hot add" operations such that the processing subsystem 208a is now provided a portion of the connection resources (e.g., the x8 connection provided via the bus exchange switch device 212 to the two x4 connectors "3" and "4" in the riser device 216) to the endpoint subsystems 218 and 218b.

As such, when a "hot-remove" operation occurs (i.e., preparing for and allowing a device to be removed while the host operating system remains running), any connections may be modified as needed. Subsequently, when setup is completed, a "hot add" operation may be performed that trains the physical link, interrupts the host operating system to discover new devices, loads device drivers, and brings the device online. As would be understood by one of skill in the art in possession of the present disclosure, the processing system may be informed of such "hot remove" operations via an interrupt and/or other notification mechanism that causes the processing system to pause further I/O's and fail any outstanding 110s through a link (e.g., such as a link provided by element 214b) as part of a recovery mechanism not described herein in detail.

Furthermore, with reference to the portion of the method 300 discussed above with reference to the "link retraining" operations, at block 314 the connection configuration engine in the BMC device 220 may cause each of the endpoint subsystems 218a and 218b to perform the "lower maximum bus width advertisement" operations, and may operate at block 316 to reconfigure the bus exchange switch device 212 (e.g., via an I²C communication provided via an I²C bus to the bus exchange switch device) by, for example, providing for the modification of the physical connections provided by the bus exchange switch device 212 (e.g., via the modification of multiplexers in the bus exchange switch device 212) to disconnect x8 connections included in the connection 214a to the processing subsystem 206a from x8 connections included in the connection 217 provided to the riser device 216 (indicated by the change of the "x16" element located in the bus exchange switch device 212 and adjacent the connection 214a in FIG. 4 to a "x8" element in FIG. 6). At block 318 the connection configuration engine in the BMC device 220 may cause the processing subsystem 206a to perform the "link retraining" operations corresponding to its lower bus width that results from the reconfiguration of the bus exchange switch device 212 at block 316, and may operate at block 320 reconfigure the bus exchange switch device 212 to provide for the connection of x8 connections included in the connection 214b to the processing subsystem 208a to respective x8 connections included in the connection 217 provided to the riser device 216 (indicated by the change of "x0" element located in the bus exchange switch device 212 and adjacent the connection 214b in FIG. 4 to a "x8" element in FIG. 6). As such, the processing subsystem 208a is now provided a portion of the connection resources (e.g., the x8 connection provided via the bus exchange switch device 212 to the two x4 connectors "3" and "4" in the riser device 216) to the endpoint subsystems 218 and 218b. Thus, when only a bus width change is occurring in the system (i.e., with no endpoint addition or removal), the bus switch may be reconfigured to provide different upstream and downstream bus widths (e.g., releasing some lanes on one link while adding lanes on another link within an overall x16 link width), an operation that may occur within the host completion timeout period (e.g., 1 second), and that is followed by a link retrain request that operates to renegotiate on a new max bus width.

Figure 7:
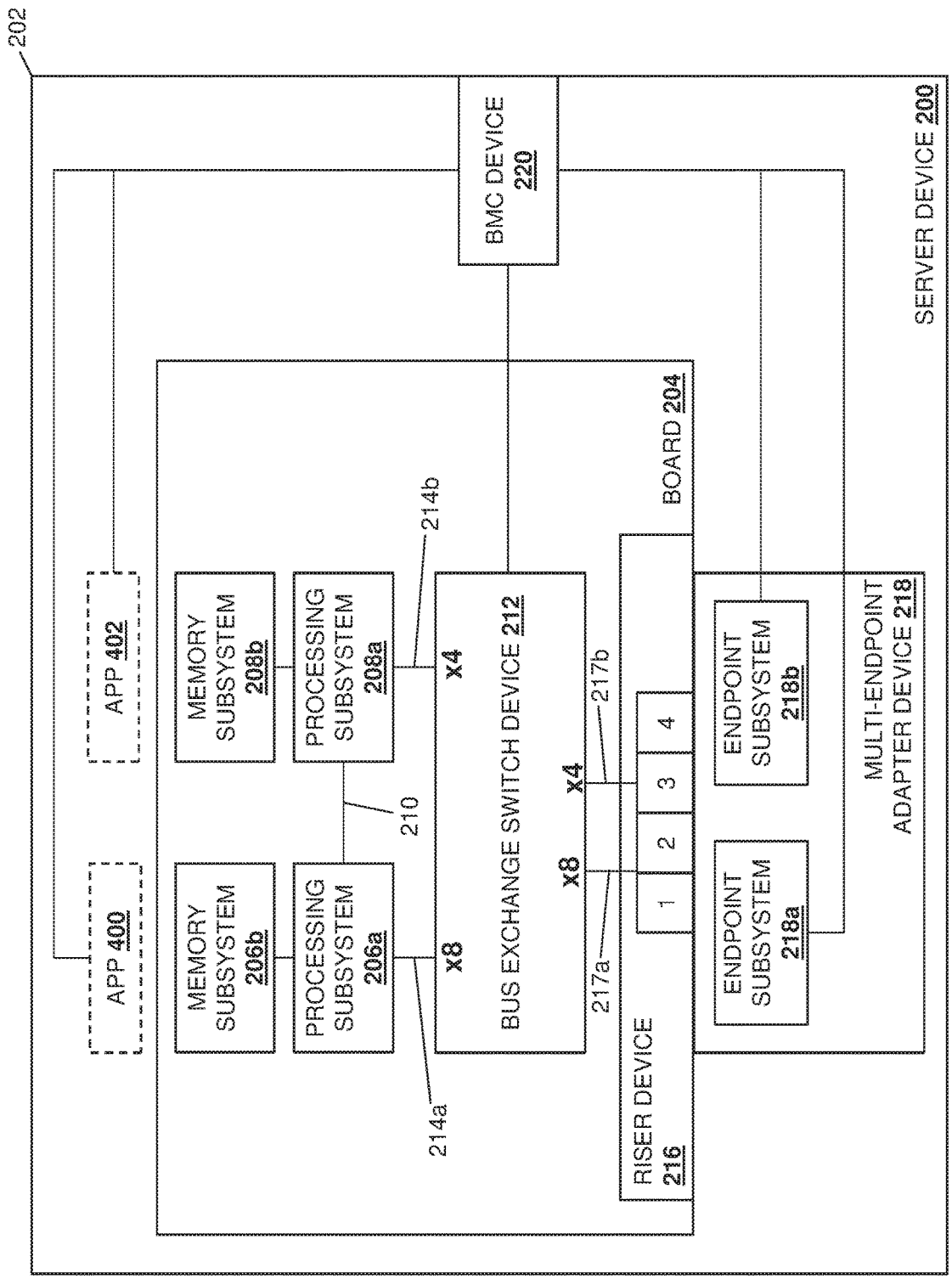
FIG. 7 is a schematic view illustrating an embodiment of the processing subsystem/endpoint subsystem connection configuration system in the server device of FIG. 2 having reconfigured connections between processing subsystem(s) and endpoint subsystem(s) illustrated in FIG. 4.

With reference to FIGS. 4 and 7, at block 304 the connection resource request received by the connection configuration engine in the BMC device 220 may request (or provide for) a reconfiguration that reallocates a portion of the connection resources to the processing subsystem 208a. For example, the application 402 provided by the processing subsystem 208a (e.g., via execution of the application code stored on the memory subsystem 208b as discussed above) may require at least some bandwidth available to the endpoint subsystems, and thus the host agent (e.g., running in the application 402 or elsewhere) may generate and transmit the connection resource request that provides for reallocation of a portion of the connection resources to the processing subsystem 208a. As will be appreciated by one of skill in the art in possession of the present disclosure, such a reallocation will provide both the "hot plug" scenario and the "link retraining" scenario discussed above, as the connection configuration resource change involves the endpoint subsystem(s) reallocating a portion of their connection resources with the processing subsystem 206a to the processing subsystem 208a, and being provided connection resources to the processing subsystem 208a that they were not previously connected to.

Thus, with reference to the method 300 discussed above with reference to the "hot plug" operations, at block 308 the connection configuration engine in the BMC device 220 may cause each of the endpoint subsystems 218*a* and 218*b* to perform the "hot removal" operations and, once those "hot removal" operations are completed, may operate at block 310 to reconfigure the bus exchange switch device 212 (e.g., via an I²C communication provided via an I²C bus to the bus exchange switch device) by, for example, providing for the modification of the physical connections provided by the bus exchange switch device 212 (e.g., via modifications to the multiplexers in the bus exchange switch device 212) to disconnect x8 connections included in the connection 214*a* to the processing subsystem 206*a* from x8 connections included in the connection 217 provided to the riser device 216 (indicated by the change of the "x16" element located in the bus exchange switch device 212 and adjacent the connection 214*a* in FIG. 4 to a "x8" element in FIG. 7), while providing for the connection of x4 connections included in the connection 214*b* to the processing subsystem 208*a* to respective x4 connections included in the connection 217 provided to the riser device 216 (indicated by the change of "x0" element located in the bus exchange switch device 212 and adjacent the connection 214*b* in FIG. 4 to a "x4" element in FIG. 7). At block 312, the connection configuration engine in the BMC device 220 may then cause each of the endpoint subsystems 218*a* and 218*b* to perform the "hot add' operations such that the processing subsystem 208*a* is now provided a portion of the connection resources (e.g., the x4 connection provided via the bus exchange switch device 212 to the x4 connector "3" in the riser device 216) to the endpoint subsystems 218 and 218*b*.

As such, similarly as discussed above, when a "hot-remove" operation occurs (i.e., preparing for and allowing a device to be removed while the host operating system remains running), any connections may be modified as needed. Subsequently, when setup is completed, a "hot add" operation may be performed that trains the physical link, interrupts the host operating system to discover new devices, loads device drivers, and brings the device online. As would be understood by one of skill in the art in possession of the present disclosure, the processing system may be informed of such "hot remove" operations via an interrupt and/or other notification mechanism that causes the processing system to pause further I/O's and fail any outstanding I/Os through a link (e.g., such as a link provided by element 214*b*) as part of a recovery mechanism not described herein in detail.

Furthermore, with reference to the method 300 discussed above with reference to the "link retraining" operations, at block 314 the connection configuration engine in the BMC device 220 may cause each of the endpoint subsystems 218*a* and 218*b* to perform the "lower maximum bus width advertisement" operations, and may operate at block 316 to reconfigure the bus exchange switch device 212 (e.g., via an I²C communication [provided via an I²C bus to the bus exchange switch device) by, for example, providing for the modification of the physical connections provided by the bus exchange switch device 212 (e.g., via modifications to multiplexers in the bus exchange switch device 212) to disconnect x8 connections included in the connection 214*a* to the processing subsystem 206*a* from x8 connections included in the connection 217 provided to the riser device 216 (indicated by the change of the "x16" element located in the bus exchange switch device 212 and adjacent the connection 214*a* in FIG. 4 to a "x8" element in FIG. 7). At block 318, the connection configuration engine in the BMC device 220 may cause the processing subsystem 206*a* to perform the "link retraining" operations corresponding to its lower bus width that results from the reconfiguration of the bus exchange switch device 212 at block 316, and may operate at block 320 reconfigure the bus exchange switch device 212 to provide for the connection of x4 connections included in the connection 214*b* to the processing subsystem 208*a* to respective x4 connections included in the connection 217 provided to the riser device 216 (indicated by the change of "x0" element located in the bus exchange switch device 212 and adjacent the connection 214*b* in FIG. 4 to a "x4" element in FIG. 7). As such, the processing subsystem 208*a* is now provided a portion of the connection resources (e.g., the x4 connection provided via the bus exchange switch device 212 to the x4 connector "3" in the riser device 216) to the endpoint subsystems 218 and 218*b*. Thus, similarly as discussed above, when only a bus width change is occurring in the system (i.e., with no endpoint addition or removal), the bus switch may be reconfigured to provide different upstream and downstream bus widths (e.g., releasing some lanes on one link while adding lanes on another link within an overall x16 link width), an operation that may occur within the host completion timeout period (e.g., 1 second), and that is followed by a link retrain request that operates to renegotiate on a new max bus width.

Figure 8:
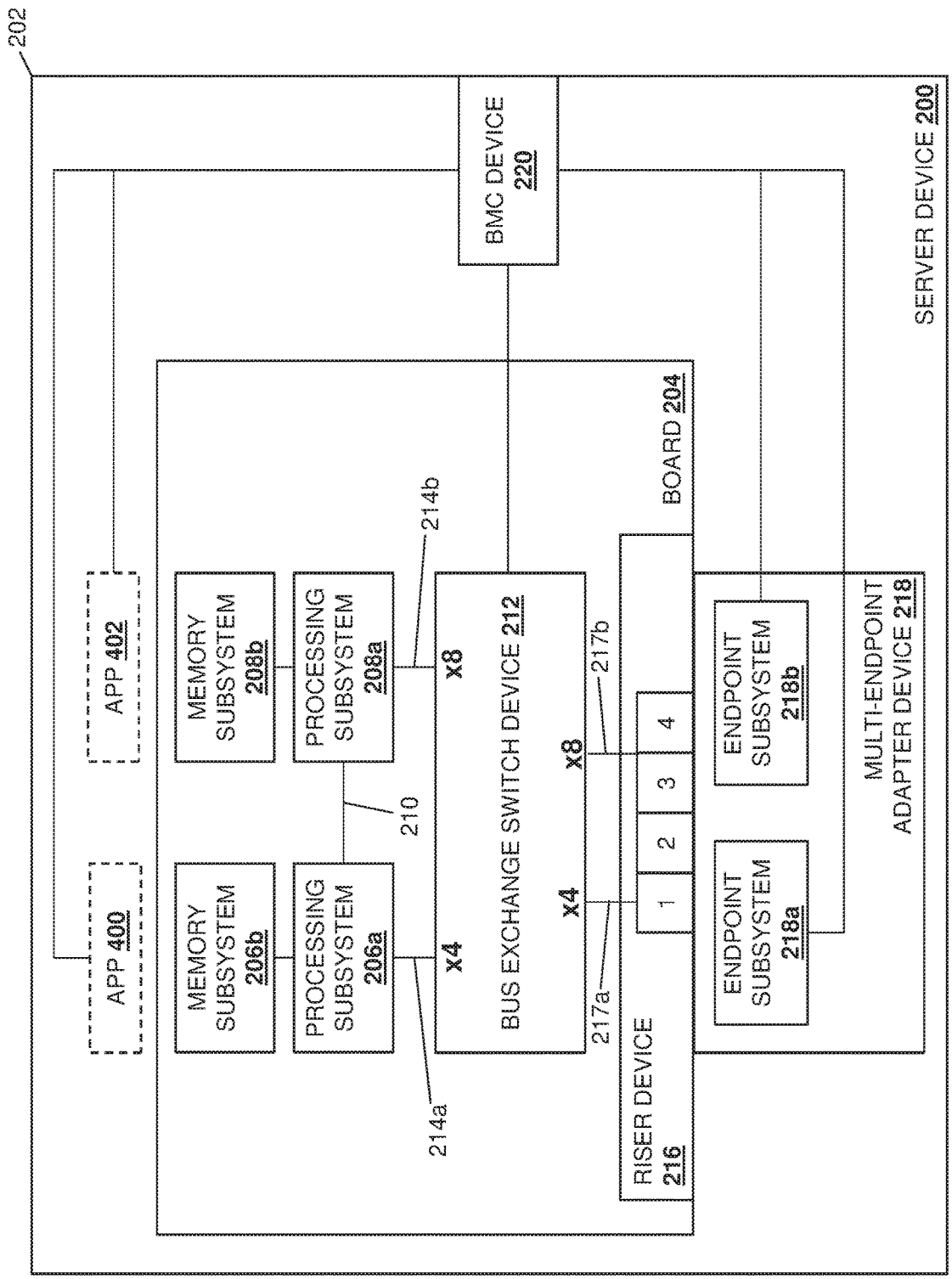
FIG. 8 is a schematic view illustrating an embodiment of the processing subsystem/endpoint subsystem connection configuration system in the server device of FIG. 2 having reconfigured connections between processing subsystem(s) and endpoint subsystem(s) illustrated in FIG. 4.

With reference to FIGS. 4 and 8, at block 304 the connection resource request received by the connection configuration engine in the BMC device 220 may request (or provide for) a reconfiguration that reallocates a portion of the connection resources to the processing subsystem 208*a*. For example, the application 402 provided by the processing subsystem 208*a* (e.g., via execution of the application code stored on the memory subsystem 208*b* as discussed above) may require at least some bandwidth available to the endpoint subsystems, and thus the host agent (e.g., running in the application 402 or elsewhere) may generate and transmit the connection resource request that provides for reallocation of a portion of the connection resources to the processing subsystem 208*a*, As will be appreciated by one of skill in the art in possession of the present disclosure, such a reallocation will provide both the "hot plug" scenario and the "link retraining" scenario discussed above, as the connection configuration resource change involves the endpoint subsystem(s) reallocating a portion of their connection resources with the processing subsystem 206*a* to the processing subsystem 208*a*, and being provided connection resources to the processing subsystem 208*a* that they were not previously connected to.

Thus, with reference to the method 300 discussed above with reference to the "hot plug" operations, at block 308 the connection configuration engine in the BMC device 220 may cause each of the endpoint subsystems 218*a* and 218*b* to perform the "hot removal" operations and, once those "hot removal" operations are completed, may operate at block 310 to reconfigure the bus exchange switch device 212 (e.g., via an I²C communication provided via an I²C bus to the bus exchange switch device) by, for example, providing for the modification of the physical connections provided by the bus exchange switch device 212 (e.g., via modifications to the multiplexers in the bus exchange switch device 212) to disconnect x12 connections included in the connection 214*a* to the processing subsystem 206*a* from x12 connections included in the connection 217 provided to the riser device 216 (indicated by the change of the "x16" element located in the bus exchange switch device 212 and adjacent the connection 214*a* in FIG. 4 to a "x4" element in FIG. 8), while providing for the connection of x8 connections included in the connection 214b to the processing subsystem 208a to respective x8 connections included in the connection 217 provided to the riser device 216 (indicated by the change of "x0" element located in the bus exchange switch device 212 and adjacent the connection 214b in FIG. 4 to a "x8" element in FIG. 8). At block 312 the connection configuration engine in the BMC device 220 may then cause each of the endpoint subsystems 218a and 218b to perform the "hot add" operations such that the processing subsystem 208a is now provided a portion of the connection resources (e.g., the x8 connection provided via the bus exchange switch device 212 to the x4 connectors "3" and "4" in the riser device 216) to the endpoint subsystems 218 and 218b.

As such, similarly as discussed above, when a "hot-remove" operation occurs (i.e., preparing for and allowing a device to be removed while the host operating system remains running), any connections may be modified as needed, Subsequently, when setup is completed, a "hot add" operation may be performed that trains the physical link, interrupts the host operating system to discover new devices, loads device drivers, and brings the device online. As would be understood by one of skill in the art in possession of the present disclosure, the processing system may be informed of such "hot remove" operations via an interrupt and/or other notification mechanism that causes the processing system to pause further I/O's and fail any outstanding I/Os through a link (e.g., such as a link provided by element 214b) as part of a recovery mechanism not described herein in detail.

Furthermore, with reference to the method 300 discussed above with reference to the "link retraining" operations, at block 314 the connection configuration engine in the BMC device 220 may cause each of the endpoint subsystems 218a and 218b to perform the "lower maximum bus width advertisement" operations, and may operate at block 316 to reconfigure the bus exchange switch device 212 (e.g., via an I²C communication provided via an I²C bus to the bus exchange switch device) by, for example, providing for the modification of the physical connections provided by the bus exchange switch device 212 (e.g., via modifications to the multiplexers in the bus exchange switch device 212) to disconnect x12 connections included in the connection 214a to the processing subsystem 206a from x12 connections included in the connection 217 provided to the riser device 216 (indicated by the change of the "x16" element located in the bus exchange switch device 212 and adjacent the connection 214a in FIG. 4 to a "x4" element in FIG. 8). At block 318, the connection configuration engine in the BMC device 220 may cause the processing subsystem 206a to perform the "link retraining" operations corresponding to its lower bus width that results from the reconfiguration of the bus exchange switch device 212 at block 316, and may operate at block 320 reconfigure the bus exchange switch device 212 to provide for the connection of x8 connections included in the connection 214b to the processing subsystem 208a to respective x8 connections included in the connection 217 provided to the riser device 216 (indicated by the change of "x0" element located in the bus exchange switch device 212 and adjacent the connection 214b in FIG. 4 to a "x8" element in FIG. 8). As such, the processing subsystem 208a is now provided a portion of the connection resources (e.g., the x8 connection provided via the bus exchange switch device 212 to the x4 connectors "3" and "4" in the riser device 216) to the endpoint subsystems 218 and 218b. Thus, similarly as discussed above, when only a bus width change is occurring in the system (i.e., with no endpoint addition or removal), the bus switch may be reconfigured to provide different upstream and downstream bus widths (e.g., releasing some lanes on one link while adding lanes on another link within an overall x16 link width), an operation that may occur within the host completion timeout period (e.g., 1 second), and that is followed by a link retrain request that operates to renegotiate on a new max bus width.

Thus, systems and methods have been described that provide for the configuration of connections between processing subsystems and endpoints subsystems in a server device using a bus exchange switch device that allocates connection resources to particular processing subsystems and endpoint subsystems in response to connection resource requests. A connection configuration subsystem receives a connection resource request for first connection resources for a first processing subsystem for communicating with at least one endpoint subsystem provided on a multi-endpoint adapter device coupled to the bus exchange switch device. Depending on the current connection configuration between the processing subsystems and the endpoint subsystems, the connection reconfigurations that involve a "hot plug" scenario and/or a "link retraining" scenario. In the "hot plug" scenario, the connection configuration subsystem causes endpoint subsystem(s) affected by the connection reconfigurations to perform "hot removal" operations, reconfigures the bus exchange switch device in order to reconfigure the connections according to the connection resource request, and then causes endpoint subsystem(s) affected by the connection reconfigurations to perform "hot add" operations, following which the first connection resources will be provided for the first processing subsystem for communicating with the at least one endpoint subsystem. In the "link retraining" scenario, the connection configuration subsystem causes endpoint subsystem(s) affected by the connection reconfigurations to perform "lower maximum bus width advertisement" operations, reconfigures the bus exchange switch device in order to remove connections from those endpoint subsystems, causes processing subsystem(s) affected by the connection reconfigurations to perform "link retraining" operations, and then reconfigures the bus exchange switch device to add connections to endpoint subsystems.

As such, the connection configuration subsystem may orchestrate static/"cold" connection reconfigurations when the server device is powered down, operating system "hot plug" connection reconfigurations when an endpoint becomes available or unavailable during runtime operations for the server device, and "live bus retraining" connection reconfigurations to modify lane widths between processing subsystems and endpoint subsystems. Thus, the connection reconfiguration techniques provided by the present disclosure enable the use of a common riser device and multi-endpoint adapter device for various connection scenarios, allowing for upgrades, connection re-balancing, and connection re-mapping during boot and runtime operations to ensure server device uptime. Furthermore, the connection reconfiguration techniques provided by the present disclosure eliminate the need for providing an external bus exchange switch or PCIe switch to allow for some desired configurations.

Furthermore, the present disclosure is being filed along with U.S. patent application Ser. No. 16/396,022, filed on Apr. 26, 2019, and directed to virtual machine deployment techniques; U.S. patent application Ser. No. 16/396,200, filed on Apr. 26, 2019, and directed to data splitting techniques; U.S. patent application Ser. No. 16/396,320, filed on Apr. 26, 2019, and directed to data duplicating techniques; U.S. patent application Ser. No. 16/ 396,453, filed on Apr.

26, 2019, and directed to packet routing techniques; U.S. patent application Ser. No. 16/3995,468, filed on Apr. 26, 2019, and directed to communication coupling configuration techniques; and U.S. patent application Ser. No. 16/395,584, filed on Apr. 26, 2019, and directed to sideband communication techniques; each of which include embodiments that utilize the multi-processor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processing subsystem/endpoint subsystem connection configuration system, comprising:
a plurality of processing subsystems that include a first processing subsystem;
a multi-endpoint adapter device that provides a plurality of endpoint subsystems;
a bus exchange switch device that couples the plurality of processing subsystems to the plurality of endpoint subsystems, wherein the first processing subsystem is connected to the bus exchange switch device via a first connection having a first plurality of lanes; and
a connection configuration engine that is coupled to the multi-endpoint adapter device and the bus exchange switch device, wherein the connection configuration engine is configured to:
receive, from a host agent associated with a first application provided by the first processing subsystem, a connection resource request that requests connection resources for the first application provided by the first processing subsystem;
cause, based on the connection resource request, at least one of the plurality of endpoint subsystems to perform a first connection resource change operation; and
configure, based on the connection resource request, the bus exchange switch device to provide the connection resources for the first processing subsystem by changing a number of the first plurality of lanes in the first connection that are connected to the multi-endpoint adapter device via the bus exchange switch device.

2. The system of claim 1, wherein the first connection resource change operation is one of a hot removal operation and a lower maximum bus width advertisement operation.

3. The system of claim 1, wherein the connection configuration engine is configured to:
cause, subsequent to configuring the bus exchange switch device, the at least one of the plurality of endpoint subsystems to perform a second connection resource change operation.

4. The system of claim 3, wherein the second connection resource change operation is a hot add operation.

5. The system of claim 1, wherein the plurality of processing subsystems that include a second processing subsystem, and wherein the connection configuration engine is configured to:
cause, subsequent to configuring the bus exchange switch device, at least one of the first processing subsystem and the second processing subsystem to perform a second connection resource change operation.

6. The system of claim 5, wherein the second connection resource change operation is a link retraining operation.

7. The system of claim 1, further comprising:
a Baseboard Management Controller (BMC) device that provides the connection configuration engine.

8. An Information Handling System (IHS), comprising:
a first processing system; and
a first memory system that is coupled to the first processing system and that includes instructions that, when executed by the first processing system, cause the first processing system to provide a connection configuration engine that is configured to:
receive, from a host agent associated with a first application provided by a first processing subsystem that is included in a plurality of processing subsystems provided by a second processing system, a connection resource request that requests connection resources for the first application provided by the first processing subsystem;
cause, based on the connection resource request, at least one of a plurality of endpoint subsystems that are included on a multi-endpoint adapter device to perform a first connection resource change operation; and
configure, based on the connection resource request, a bus exchange switch device that couples the plurality of processing subsystems to the plurality of endpoint subsystems in order to provide the connection resources for the first processing subsystem by changing a number of a first plurality of lanes in a first connection that connects the first processing subsystem to the multi-endpoint adapter device via the bus exchange switch device.

9. The IHS of claim 8, wherein the first connection resource change operation is one of a hot removal operation and a lower maximum bus width advertisement operation.

10. The IHS of claim 8, wherein the connection configuration engine is configured to:
cause, subsequent to configuring the bus exchange switch device, the at least one of the plurality of endpoint subsystems to perform a second connection resource change operation.

11. The IHS of claim 10, wherein the second connection resource change operation is a hot add operation.

12. The IHS of claim 8, wherein the second processing system includes a second processing subsystem that is included in the plurality of processing subsystems, and wherein the connection configuration engine is configured to:
cause, subsequent to configuring the bus exchange switch device, at least one of the first processing subsystem or the second processing subsystem to perform a second connection resource change operation.

13. The IHS of claim 12, wherein the second connection resource change operation is a link retraining operation.

14. A method for configuring connections between processing subsystems and endpoint subsystems, comprising:
receiving, by a connection configuration subsystem from a host agent associated with a first application provided by a first processing subsystem included in a processing system that includes a plurality of processing subsystems, connection resource request that requests connection resources for the first application provided by the first processing subsystem;

causing, by the connection configuration subsystem based on the connection resource request, at least one of a plurality of endpoint subsystems that are included on a multi-endpoint adapter device to perform a first connection resource change operation; and configuring, by the connection configuration subsystem based on the connection resource request, a bus exchange switch device that couples the plurality of processing subsystems to the plurality of endpoint subsystems in order to provide the connection resources for the first processing subsystem by changing a number of a first plurality of lanes in a first connection that connects the first processing subsystem to the multi-endpoint adapter device via the bus exchange switch device.

15. The method of claim 14, wherein the first connection resource change operation is one of a hot removal operation and a lower maximum bus width advertisement operation.

16. The method of claim 14, further comprising:
causing, by the connection configuration subsystem subsequent to configuring the bus exchange switch device, the at least one of the plurality of endpoint subsystems to perform a second connection resource change operation.

17. The method of claim 16, wherein the second connection resource change operation is a hot add operation.

18. The method of claim 14, wherein the processing system includes a second processing subsystem that is included in the plurality of processing subsystems, and wherein the method further comprises:
causing, by the connection configuration subsystem subsequent to configuring the bus exchange switch device, at least one of the first processing subsystem and the second processing subsystem to perform a second connection resource change operation.

19. The method of claim 18, wherein the second connection resource change operation is a link retraining operation.

20. The method of claim 14, wherein the connection configuration subsystem is included in a Baseboard Management Controller (BMC) device.

* * * * *